United States Patent
Park et al.

(10) Patent No.: US 12,466,324 B2
(45) Date of Patent: Nov. 11, 2025

(54) LUGGAGE BOARD FOR CAR, LUGGAGE BOARD MANUFACTURING FRAME FOR CAR AND METHOD OF MANUFACTURING LUGGAGE BOARD FOR CAR

(71) Applicants: Hyundai Motor Company, Seoul (KR); Kia Corporation, Seoul (KR); Hanwha Advanced Materials Corporation, Seoul (KR)

(72) Inventors: Hee Sang Park, Seoul (KR); Won Jong Lee, Suwon-Si (KR); Sang Eun Jahng, Suwon-Si (KR); Yeon Sim Yoon, Yongin-Si (KR); Seung Kun Lee, Suwon-Si (KR); Seok Cheol Kim, Suwon-Si (KR); Dong Han Lee, Sejong-Si (KR); Hak Bong Lee, Cheongju-Si (KR); Eun Gi Kim, Cheongju-Si (KR); Jae Sung Byun, Sejong-Si (KR)

(73) Assignees: Hyundai Motor Company, Seoul (KR); Kia Corporation, Seoul (KR); Hanwha Advanced Materials Corporation, Seoul (KR)

( * ) Notice: Subject to any disclaimer, the term of this patent is extended or adjusted under 35 U.S.C. 154(b) by 148 days.

(21) Appl. No.: 17/984,844

(22) Filed: Nov. 10, 2022

(65) Prior Publication Data
US 2024/0157878 A1    May 16, 2024

(51) Int. Cl.
*B60R 5/04*    (2006.01)
*B60R 9/00*    (2006.01)

(52) U.S. Cl.
CPC . *B60R 5/04* (2013.01); *B60R 9/00* (2013.01)

(58) Field of Classification Search
CPC .............. B60R 5/04; B60R 5/003; B60R 9/00
See application file for complete search history.

(56) References Cited

U.S. PATENT DOCUMENTS

| | | | | |
|---|---|---|---|---|
| 2013/0255176 A1* | 10/2013 | Roberts | ................... | E04G 1/153 |
| | | | | 181/290 |
| 2013/0278002 A1* | 10/2013 | Preisler | ..................... | B60R 5/00 |
| | | | | 296/37.5 |
| 2014/0077518 A1* | 3/2014 | Preisler | ................... | B32B 21/14 |
| | | | | 296/37.5 |
| 2014/0147622 A1* | 5/2014 | Preisler | ..................... | B32B 3/02 |
| | | | | 428/116 |
| 2014/0154461 A1* | 6/2014 | Preisler | ..................... | B32B 3/12 |
| | | | | 428/116 |
| 2015/0145276 A1* | 5/2015 | Preisler | ................. | B60R 13/013 |
| | | | | 296/97.23 |
| 2018/0099616 A1* | 4/2018 | Wright | ................... | B32B 29/005 |
| 2021/0023811 A1* | 1/2021 | Preisler | ................... | B60N 3/048 |
| 2022/0144352 A1* | 5/2022 | Nelson | ..................... | A47B 3/10 |

FOREIGN PATENT DOCUMENTS

EP          3944989 A1 *  2/2022  ............... B60R 5/04
KR     10-2337937 B1    12/2021

* cited by examiner

*Primary Examiner* — Derek J Battisti
(74) *Attorney, Agent, or Firm* — Morgan Lewis & Bockius LLP (57) ABSTRACT

A luggage board for a vehicle includes a core layer; a first layer covering a portion of the core layer; and a second layer covering a remaining portion of the core layer except for a region covered by the first layer. End portions of the first layer and the second layer disposed on a side surface of the core layer are bonded to each other.

9 Claims, 8 Drawing Sheets

LUGGAGE BOARD FOR CAR, LUGGAGE BOARD MANUFACTURING FRAME FOR CAR AND METHOD OF MANUFACTURING LUGGAGE BOARD FOR CAR

CROSS-REFERENCE TO RELATED APPLICATION(S)

The present application claims priority to Korean Patent Application No. 10-2022-0055637 filed on May 4, 2022 the entire contents of which is incorporated herein for all purposes by this reference.

BACKGROUND OF THE PRESENT DISCLOSURE

Field of the Present Disclosure

The present disclosure relates to a luggage board for a car, a luggage board manufacturing frame for a car, and a method of manufacturing a luggage board for a car.

Description of Related Art

In general, a cargo loading space which may accommodate various kinds of cargo is provided behind the rear seat of an SUV vehicle, and the floor of the cargo loading space is usually formed of a luggage board.

The luggage board should be formed of high-rigidity parts so that a relatively heavy load may be loaded in the cargo loading space of the vehicle, and weight reduction is required to improve fuel efficiency of the vehicle.

In accordance with these requirements, luggage boards are being manufactured through various manufacturing methods.

On the other hand, in the case of a sandwich panel formed in various manufacturing methods, the weight reduction effect is excellent, the manufacturing costs are low, as compared to other manufacturing methods, and the rigidity is excellent in consideration of cargo loading, but there are disadvantages in that the appearance quality may be inferior.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a luggage board for a vehicle which may maintain appearance quality while having excellent rigidity.

An exemplary embodiment provides a method of manufacturing a luggage board for a car, in which manufacturing is facilitated.

Various exemplary embodiments of the present disclosure may provide a luggage board manufacturing frame for a car, in which appearance quality may be maintained while having excellent rigidity.

According to an aspect of the present disclosure, a luggage board for a vehicle includes a core layer; a first layer covering a portion of the core layer; and a second layer covering a remaining portion of the core layer except for a region covered by the first layer. end portions of the first layer and the second layer disposed on a side surface of the core layer are bonded to each other.

The first layer may include a first intermediate layer, a 1-1 layer disposed on one surface of the first intermediate layer, and a 1-2 layer disposed on the other surface of the first intermediate layer, and the second layer may include a second intermediate layer, a 2-1 layer disposed on one surface of the second intermediate layer, and a 2-2 layer disposed on the other surface of the second intermediate layer.

An end portion of at least one of the first layer and the second layer may be bent.

The first layer disposed on the side surface of the core layer may be disposed further inwardly than the second layer disposed on the side surface of the core layer.

The first intermediate layer and the second intermediate layer may be formed of a material including a fiberglass material and a polypropylene material, and the fiberglass may be contained in an amount of 20% to 60%.

The fiberglass included in the first intermediate layer and the second intermediate layer may be contained in an amount of 30% to 55%.

The 1-2 layer in contact with the core layer, and the 2-1 layer may be formed of a polypropylene film.

The core layer may be formed of a material including any one of expanded polystyrene, expanded polypropylene (EPP), and expanded polyolefin (EPO).

The 1-1 layer may be formed of a nonwoven fabric of a polypropylene film or polyethylene terephthalate material.

The luggage board for a vehicle may further include a cover layer disposed to cover at least the second layer.

The cover layer may be formed of a non-woven fabric or a woven fabric.

The core layer may have a step portion disposed on an edge portion of a lower surface in the core layer.

A bonding portion between the first layer and the second layer may be disposed on an upper edge side of the core layer.

According to an aspect of the present disclosure, a luggage board manufacturing frame for a vehicle includes a first frame; and a second frame forming a luggage board for a vehicle together with the first frame, and including a side wall portion disposed outwardly of the first frame.

The first frame may be provided with an insertion groove into which the luggage board for a vehicle is inserted, and may be provided with a protruding wall portion at an edge portion thereof, supporting a side surface of the luggage board for a car, and an internal surface of the protruding wall portion and an internal surface of the side wall portion may be spaced from each other.

The second frame may be provided with at least one vacuum hole.

The vacuum hole may be disposed at an edge portion of an indentation groove of the second frame.

In the first frame, an insertion groove may be provided, and a depth of the edge portion of the insertion groove may be less than an internal depth of the insertion groove.

When the first frame and the second frame are combined, a lower edge portion of the second frame may be in contact with an internal surface of an insertion groove of the first frame.

According to an aspect of the present disclosure, a method of manufacturing a luggage board for a vehicle includes loading a first layer into a first frame; loading a core layer onto an upper portion of the first layer; and loading a second layer between the core layer and the second frame. The core layer may be provided with a protrusion in a region disposed at an edge portion of an indentation groove of the second frame.

The protrusion may have a triangular cross-section.

A protruding width of the protrusion may have a length equal to 20% to 40% of a thickness of a center portion of the core layer.

A protruding height of the protrusion may have a length equal to 40% to 60% of a thickness of a center portion of the core layer.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Prior to the detailed description of the present disclosure, the terms or words used in the present specification and claims described below may not be construed as being limited to their ordinary or dictionary meanings, and to describe the inventor's invention in the best way, the present disclosure may be interpreted as meaning and concept consistent with the technical spirit of the present disclosure, based on the principle that it may be appropriately defined as a concept of a term. Therefore, the exemplary embodiments described in the present specification and the configurations illustrated in the drawings are only the most exemplary embodiments of the present disclosure, and do not represent all the technical spirit of the present disclosure, and therefore, it should be understood that there are various equivalents which may replace them at the time of the present application.

Hereinafter, exemplary embodiments of the present disclosure will be described with reference to the accompanying drawings. However, the exemplary embodiment of the present disclosure may be modified in various other forms, and the scope of the present disclosure is not limited to the exemplary embodiments described below. Furthermore, the exemplary embodiments of the present disclosure are provided to more completely explain the present disclosure to those of ordinary skill in the art. The shapes and sizes of elements in the drawings may be exaggerated for clearer description.

Furthermore, in the present specification, the singular expression includes a plural expression unless the context clearly dictates otherwise, and the same reference signs refer to the same or corresponding elements throughout the specification.

Furthermore, in the present specification, expressions of upper side, upper portion, lower side, lower portion, side surface, front surface, rear side, and the like are expressed based on the direction illustrated in the drawings, and it is clarified in advance that it may be expressed differently if the direction of the corresponding object is changed.

Figure 1:
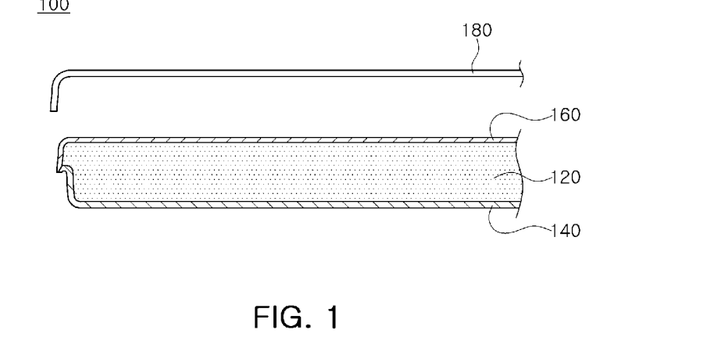
FIG. 1 is a cross-sectional view exemplarily illustrating a luggage board for a vehicle according to an exemplary embodiment of the present disclosure.
Figure 2:
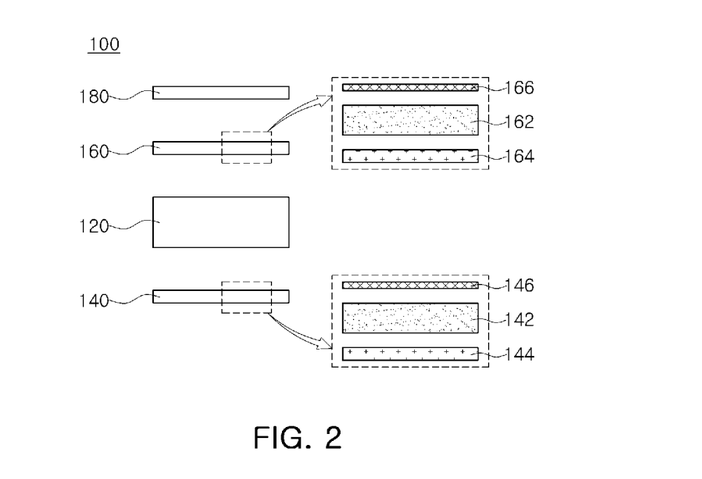
FIG. 2 is an explanatory view exemplarily illustrating the configuration of a luggage board for a vehicle according to an exemplary embodiment of the present disclosure.

FIG. 1 is a cross-sectional view exemplarily illustrating a luggage board for a vehicle according to an exemplary embodiment of the present disclosure, and FIG. 2 is an explanatory view exemplarily illustrating the configuration of a luggage board for a vehicle according to an exemplary embodiment of the present disclosure.

Referring to FIG. 1 and FIG. 2, a luggage board 100 for a vehicle (hereinafter referred to as a 'luggage board') according to various exemplary embodiments of the present disclosure may include a core layer 120, a first layer 140 and a second layer 160 as an example.

The core layer 120 may be disposed between the first layer 140 and the second layer 160, and may be formed, for example, expanded polystyrene. However, the present disclosure is not limited thereto, and the core layer 120 may be formed expanded polypropylene (EPP) or expanded polyolefin (EPO) material. On the other hand, the core layer 120 has a plate shape and may be compressed by a frame during manufacturing.

The first layer 140 is disposed to cover a portion of the core layer 120. In detail, the first layer 140 is disposed to surround the core layer 120 together with the second layer 160. For example, the first layer 140 includes a first intermediate layer 142, a 1-1 layer 144 disposed on one surface of the first intermediate layer 142, and a 1-2 layer 146 disposed on the other surface of the first intermediate layer 142.

The first intermediate layer 142 may be formed of a fiberglass and polypropylene material. In detail, the first intermediate layer 142 may be formed of a synthetic material in which fiberglass and polypropylene are mixed. As an exemplary embodiment of the present disclosure, the fiberglass may be contained in an amount of 30 to 55% of the total of the first intermediate layer 142.

On the other hand, the first intermediate layer 142 may be formed of a synthetic material of fiberglass and polypropylene, as a cold forming material, and may thus contribute to product strength improvement. On the other hand, the fiberglass may be contained in an amount of 20% to 60% of the total of the first intermediate layer 142. On the other hand, in the case in which the content of fiberglass is lower than 20%, the amount of polypropylene increases, which is advantageous for adhesion, but has a disadvantage in that the latent heat preservation time is relatively short. Furthermore, when the content of the fiberglass is higher than 60%, it is disadvantageous to adhesion, but there is a problem that the latent heat preservation time is long. Furthermore, for lamination with the core layer 120, the fiberglass content may be 300% to 55% of the total of the first intermediate layer 142. For example, when the adhesion and latent heat retention time are taken into consideration, the fiberglass content is 30% to 55% of the total of the first intermediate layer 142.

The 1-1 layer 144 may be disposed below the first intermediate layer 142. As an exemplary embodiment of the present disclosure, the 1-1 layer 144 may be formed of a polypropylene film or a polyethylene terephthalate nonwoven material. For example, the 1-1 layer 144 forms a lower external surface of the luggage board 100.

The 1-2 layer 146 may be disposed on the first intermediate layer 142. As an exemplary embodiment of the present disclosure, the 1-2 layer 146 may be formed of a polypropylene film. In detail, the 1-2 layer 146 may be formed of a polypropylene film to facilitate adhesion to the core layer 120.

The second layer 160 may be disposed to cover the remaining portion of the core layer 120 except for the area covered by the first layer 140. In detail, the second layer 160 is disposed to surround the core layer 120 together with the first layer 140. For example, the second layer 160 includes a second intermediate layer 162, a 2-1 layer 164 disposed on one surface of the second intermediate layer 162, and a 2-2 layer 166 disposed on the other surface of the second intermediate layer 162.

The second intermediate layer 162 may be formed of fiberglass and a polypropylene material. In detail, the second intermediate layer 162 may be formed of a synthetic material in which fiberglass and polypropylene are mixed. As an exemplary embodiment of the present disclosure, the fiberglass may be contained in an amount of 30 to 55% of the entire second intermediate layer 162.

On the other hand, the second intermediate layer 162 may contribute to product strength improvement by being formed of a synthetic material of fiberglass and polypropylene as a cold formation material. On the other hand, the content of the fiberglass may be 20% to 60% of the total amount of the second intermediate layer 162. On the other hand, when the content of fiberglass is lower than 20%, the amount of polypropylene increases, which is advantageous for adhesion, but has a disadvantage in that the latent heat preservation time is relatively short. Furthermore, when the content of the fiberglass is higher than 60%, there is a problem in which it is disadvantageous to adhesion, while the latent heat preservation time is long. Therefore, for lamination with the core layer 120, the fiberglass content may be 30% to 55% of the total of the second intermediate layer 162. For example, when the adhesion and latent heat retention time are taken into consideration, the fiberglass content is 30% to 55% of the total of the second intermediate layer 162.

The 2-1 layer 164 may be disposed below the second intermediate layer 162. As an exemplary embodiment of the present disclosure, the 2-1 layer 164 may be formed of a polypropylene film. In detail, the 2-1 layer 164 may be formed of a polypropylene film to facilitate adhesion to the core layer 120.

The 2-2 layer 166 may be disposed on the second intermediate layer 162. As an exemplary embodiment of the present disclosure, the 2-2 layer 166 may be formed of a polypropylene film. On the other hand, a cover layer 180 may be disposed on the 2-2 layer 166. Furthermore, the 2-2 layer 166 is formed of a polypropylene film to facilitate adhesion to the cover layer 180.

On the other hand, describing in more detail with respect to the first layer 140 and the second layer 160 disposed to surround the core layer 120, end portions of the first layer 140 and the second layer 160 disposed on the side surface of the core layer 120 are bonded to each other, and the end portion of at least one of the first layer 140 and the second layer 160 may be bent. For example, the first layer 140 surrounding the lower portion of the core layer 120 and the side surface of the core layer 120 may be manufactured by a frame to be described later so that the end portion thereof is bent to form a step with the second layer 160. For example, the first layer 140 disposed on the side surface of the core layer 120 may be disposed more inwardly than the second layer 160 disposed on the side surface of the core layer 120.

This will be described in detail in the description of a luggage board manufacturing frame for a vehicle and a method of manufacturing a luggage board for a vehicle thereby to be described later.

The cover layer 180 is disposed on the 2-2 layer 166, and may form an upper external surface of the luggage board 100. As an exemplary embodiment of the present disclosure, the cover layer 180 may be formed of a non-woven fabric or a woven fabric.

As described above, because the core layer 120 is disposed between the first layer 140 and the second layer 160, relatively high strength may be implemented. Furthermore, because the core layer 120 is formed of an expanded polystyrene material, dimensional stability is excellent, manufacturing cost is relatively low, and weight reduction may be implemented. Furthermore, because the core layer 120 is formed of an expanded polystyrene material, high-temperature physical properties may be improved.

Figure 3:
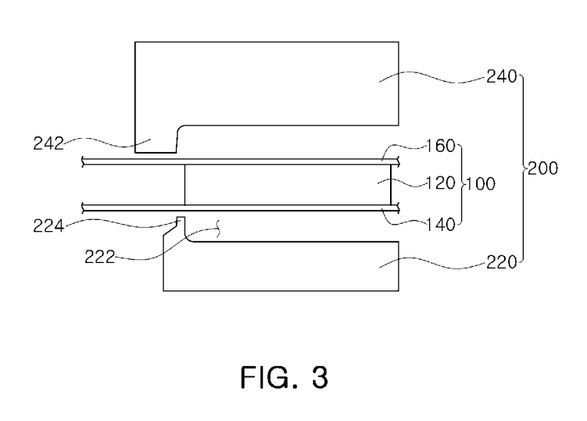
FIG. 3 is a schematic diagram illustrating a luggage board manufacturing frame for a vehicle according to an exemplary embodiment of the present disclosure.
Figure 4:
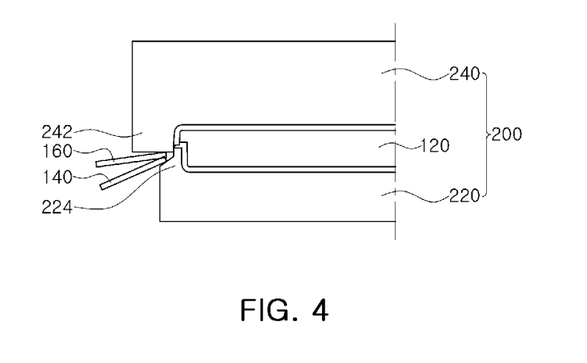
FIG. 4 is an explanatory view exemplarily illustrating a state in which a luggage board manufacturing frame for a vehicle illustrated in FIG. 3 is coupled.

FIG. 3 is a schematic diagram illustrating a luggage board manufacturing frame for a vehicle according to an exemplary embodiment of the present disclosure, and FIG. 4 is an explanatory view exemplarily illustrating a state in which the luggage board manufacturing frame for a vehicle illustrated in FIG. 3 is coupled.

Referring to FIG. 3 and FIG. 4, a luggage board manufacturing frame 200 may include, for example, a first frame 220 and a second frame 240.

The first frame 220 is coupled to the second frame 240 to compress the core layer 120, the first layer 140 and the second layer 160 disposed between the first frame 220 and the second frame 240 so that the core layer 120, the first layer 140, and the second layer 160 are adhered to each other. Furthermore, when the first and second frames 220 and 240 are coupled, a portions of the first and second layers 140 and 160, disposed outside the first and second frames 220 and 240, are cut. On the other hand, the first frame 220 may be provided with an insertion groove 222 into which the luggage board 100 is inserted, and a protruding wall portion 224 supporting the side surface of the luggage board 100 may be provided on the edge portion. Also, the first frame 220 may be a lower frame.

The second frame 240 may be coupled to the first frame 220 to form the luggage board 100, and may include a side wall portion 242 disposed outside the first frame 220. On the other hand, the side wall portion 242 may be disposed outside the protruding wall portion 224 when the second frame 240 and the first frame 220 are coupled. Furthermore, when the second frame 240 and the first frame 220 are coupled, the external surface of the side wall portion 242 may contact with the internal surface of the protruding wall portion 224. Accordingly, as illustrated in FIG. 4, when the first and second frames 220 and 240 are combined, portions of the first and second layers 140 and 160, disposed outside the first and second frames 220 and 240, are cut. Accordingly, the cut end portions of the first and second layers 140 and 160 are joined. Furthermore, the end portion of the first layer 140 may be bent while being pressed by the protruding wall portion 224. In detail, the end portion of the first layer 140 surrounding the lower portion of the core layer 120 and the side surface of the core layer 120 is bent while being pressed by the first and second frames 220 and 240, to forma step with the second layer 160. For example, the first layer 140 disposed on the side surface of the core layer 120 may be disposed more inwardly than the second layer 160 disposed on the side surface of the core layer 120.

The side of the luggage board 100 is pressed by the protruding wall portion 224 of the first frame 220 so that the side of the luggage board 100 manufactured by the first and second frames 220 and 240 may be formed to have a stepped shape. On the other hand, because the first and second layers 140 and 160 are cut in a region in which the protruding wall portion 224 of the first frame 220 and the side wall portion 242 of the second frame 240 intersect, a bonding portion of the first and second layers 140 and 160 may be disposed in the substantially side center portion of the core layer 120.

Figure 5:
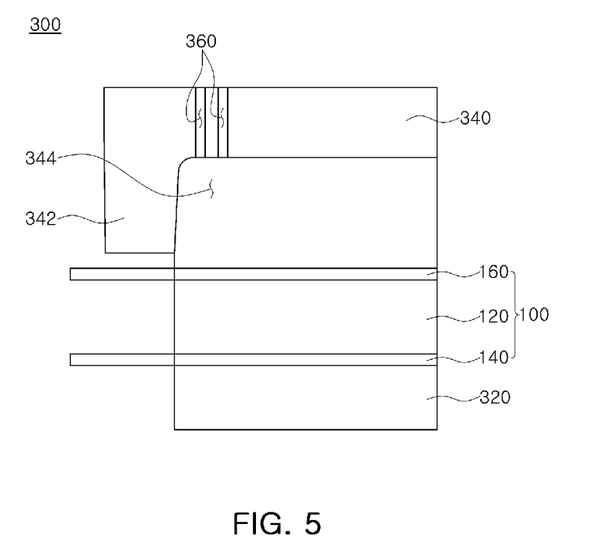
FIG. 5 is a schematic diagram illustrating a luggage board manufacturing frame for a vehicle according to an exemplary embodiment of the present disclosure.
Figure 6:
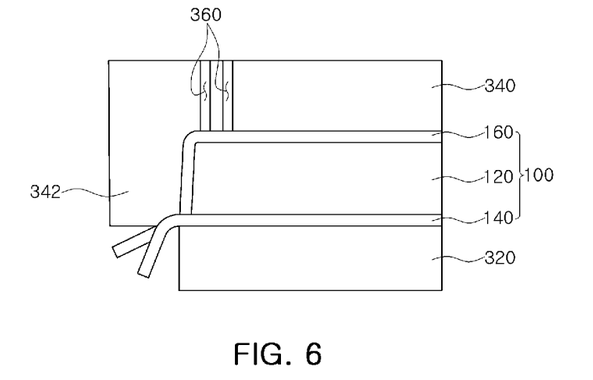
FIG. 6 is an explanatory view exemplarily illustrating a state in which the luggage board manufacturing frame for a vehicle illustrated in FIG. 5 is coupled.

FIG. 5 is a schematic diagram illustrating a luggage board manufacturing frame for a vehicle according to an exemplary embodiment of the present disclosure, and FIG. 6 is an explanatory view exemplarily illustrating a state in which the luggage board manufacturing frame for a vehicle illustrated in FIG. 5 is coupled.

Referring to FIG. 5 and FIG. 6, a luggage board manufacturing frame 300 may include, for example, a first frame 320 and a second frame 340.

The first frame 320 is coupled to the second frame 340 to compress the core layer 120, the first layer 140 and the second layer 160 disposed between the first frame 320 and the second frame 340 so that the core layer 120, the first layer 140, and the second layer 160 are adhered to each other. Furthermore, when the first and second frames 320 and 340 are coupled, portions disposed outside the first and second frames 320 and 340 among the first and second layers 140 and 160 are cut.

The second frame 340 may be coupled to the first frame 320 to form the luggage board 100, and may include a side wall portion 342 disposed outside the first frame 320. For example, an indentation groove 344 may be provided in the second frame 340. On the other hand, the side wall portion 342 may be disposed outside the first frame 320 when the first frame 320 and the second frame 340 are coupled.

At least one vacuum hole 360 may be provided in the second frame 340. As an exemplary embodiment of the present disclosure, the vacuum hole 360 may be disposed at the edge portion of the indentation groove 344 of the second frame 340. Accordingly, because the second layer 160 is in close contact with the internal surface of the second frame 340, the thickness loss may be prevented while reducing the tension pressure applied to the core layer 120. Accordingly, defects occurring at the edge portion of the luggage board 100 may be reduced. In detail, in the related art, when the first and second frames 320 and 340 are coupled to compress the core layer 120, the first layer 140 and the second layer 160 disposed therein, as the surface of the core layer 120 is melted, a thickness loss of about 25% occurs, and furthermore, as the tension pressure of the second layer 160 increases in the region disposed at the edge portion of the indentation groove 344 of the second frame 340, the thickness loss is additionally increased. Therefore, there is a problem in that appearance defects occur as the round shape of the luggage board 100 is non-uniform.

However, as described above, because the vacuum hole 360 is provided in the second frame 340, the second layer 160 is in close contact with the rounded edge portion of the indentation groove 344 of the second frame 340. Accordingly, because the tension pressure of the second layer 160 may be reduced, the thickness loss of the core layer 120 may be prevented. Accordingly, the occurrence of non-uniformity in the round shape of the luggage board 100 may be prevented to prevent appearance defects.

Figure 7:
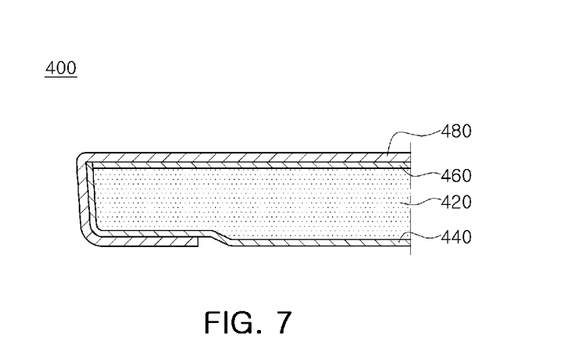
FIG. 7 is a cross-sectional view exemplarily illustrating a luggage board for a vehicle according to an exemplary embodiment of the present disclosure.
Figure 8:
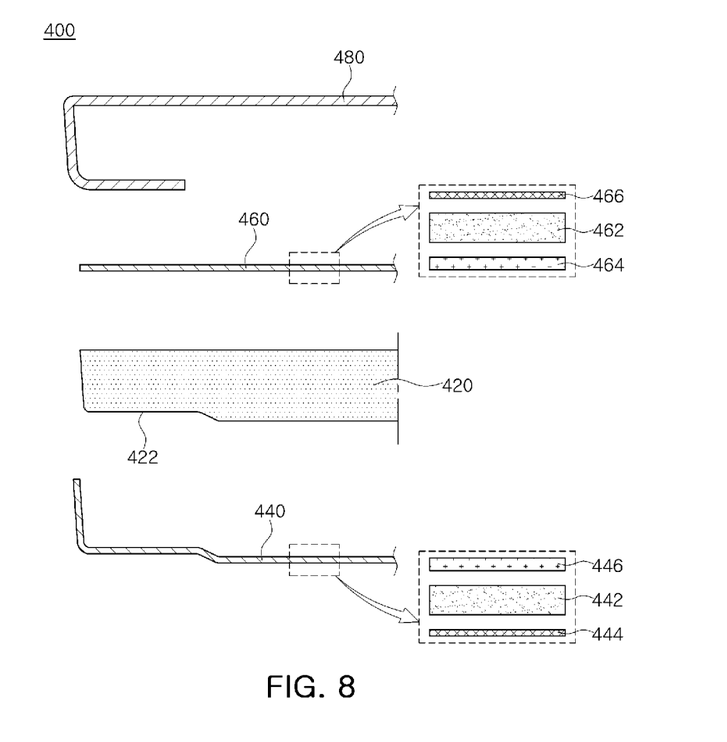
FIG. 8 is an explanatory view exemplarily illustrating the configuration of a luggage board for a vehicle according to an exemplary embodiment of the present disclosure.

FIG. 7 is a cross-sectional view exemplarily illustrating a luggage board for a vehicle according to an exemplary embodiment of the present disclosure, and FIG. 8 is an explanatory view exemplarily illustrating the configuration of a luggage board for a vehicle according to an exemplary embodiment of the present disclosure.

Referring to FIGS. 7 and 8, a luggage board 400 according to various exemplary embodiments of the present disclosure may include a core layer 420, a first layer 440, a second layer 460, and a cover layer 480 as an example.

The core layer 420 is disposed between the first layer 440 and the second layer 460, and may be formed of, for example, expanded polystyrene. On the other hand, the core layer 420 has a plate shape and may be compressed by a frame during manufacturing. Furthermore, a step portion 422 may be disposed at an edge portion of the lower surface of the core layer 420.

The first layer 440 is disposed to cover a portion of the core layer 420. In detail, the first layer 440 is disposed to surround the core layer 420 together with the second layer 460. As an exemplary embodiment of the present disclosure, the first layer 440 may be disposed to cover the lower and side surfaces of the core layer 420. Furthermore, a bonding portion between the first layer 440 and the second layer 460 may be disposed on an upper edge side of the core layer 420. A detailed description thereof will be provided later. On the other hand, the first layer 440 includes a first intermediate layer 442, a 1-1 layer 444 disposed on one surface of the first intermediate layer 442, and a 1-2 layer 446 disposed on the other surface of the first intermediate layer 442.

On the other hand, the first intermediate layer 442, the 1-1 layer 444, and the 1-2 layer 446 are substantially the same configurations as the first intermediate layer 142, the 1-1 layer 144 and the 1-2 layer 146 described above, and a detailed description thereof will be omitted herein.

The second layer 460 may be disposed to cover the remaining portion of the core layer 420, except for the area covered by the first layer 440. In detail, the second layer 460 is disposed to surround the core layer 420 together with the first layer 440. For example, the second layer 460 may be disposed to cover the upper surface of the core layer 420, and as described above, the bonding portion of the first layer 440 and the second layer 460 may be disposed on the upper edge side of the core layer 420. On the other hand, the second layer 460 includes a second intermediate layer 462, a 2-1 layer 464 disposed on one surface of the second intermediate layer 462, and a 2-2 layer 466 disposed on the other surface of the second intermediate layer 462.

On the other hand, the second intermediate layer 462, the 2-1 layer 464, and the 2-2 layer 466 are components substantially the same as the second intermediate layer 162, the 2-1 layer 164, and the 2-2 layer 166, and a detailed description thereof will be omitted herein.

The cover layer 480 may be disposed to cover the first layer 440 and the second layer 460 so that an end portion of the cover layer is disposed on the step portion 422 of the core layer 420. As an exemplary embodiment of the present disclosure, the cover layer 480 may be disposed to cover an area except for the center portion of the lower surface of the first layer 440. In the present manner, the cover layer 480 is disposed to be round while covering the upper edge portion, which is a portion in which the first layer 440 and the second layer 460 are joined, and therefore, the corner portion unformed problem of the luggage board 400 for a vehicle may be prevented by the cover layer 480. On the other hand, the cover layer 480 may be formed of a non-woven fabric.

Figure 9:
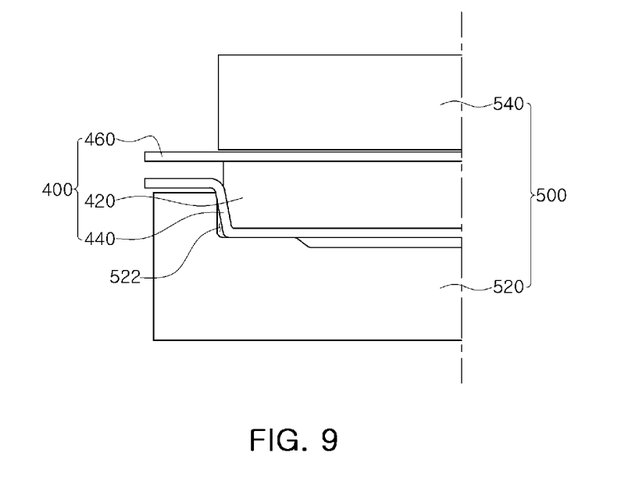
FIG. 9 is a schematic diagram illustrating a luggage board manufacturing frame for a vehicle according to an exemplary embodiment of the present disclosure.
Figure 10:
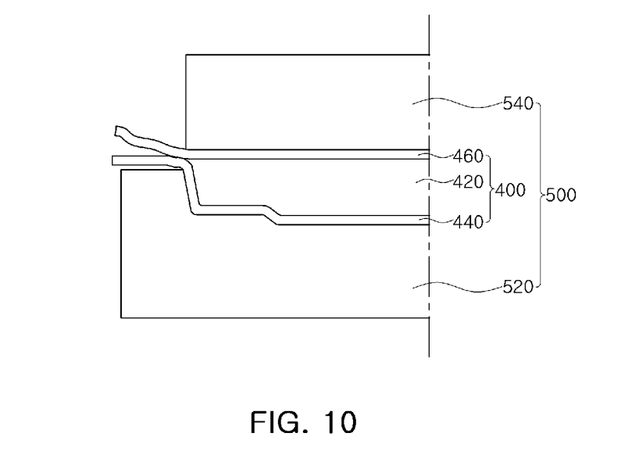
FIG. 10 is an explanatory view exemplarily illustrating a state in which the luggage board manufacturing frame for a vehicle illustrated in FIG. 9 is coupled.

FIG. 9 is a schematic diagram illustrating a luggage board manufacturing frame for a vehicle according to an exemplary embodiment of the present disclosure, and FIG. 10 is an explanatory view exemplarily illustrating a state in which the luggage board manufacturing frame for a vehicle illustrated in FIG. 9 is coupled.

Referring to FIG. 9 and FIG. 10, a luggage board manufacturing frame 500 may include, for example, a first frame 520 and a second frame 540.

The first frame 520 is coupled to the second frame 540 to compress the core layer 420, the first layer 440 and the second layer 460 disposed between the first frame 520 and the second frame 540 so that the core layer 420, the first layer 440, and the second layer 460 are adhered to each other. Furthermore, when the first and second frames 520 and 540 are coupled, portions of the first and second layers 440 and 460, disposed outside the first and second frames 520 and 540, are cut. On the other hand, the first frame 520 is provided with an insertion groove 522 into which the luggage board 400 is inserted, and the depth of the edge portion of the insertion groove 552 may be less than the depth of the internal portion. In detail, the bottom surface of the insertion groove 552 of the first frame 520 may be formed to be stepped. As an exemplary embodiment of the present disclosure, the first frame 220 may be a lower frame.

The second frame 540 is combined with the first frame 520 to form the luggage board 400. As an exemplary embodiment of the present disclosure, when the second frame 540 and the first frame 520 are combined, the lower edge portion of the second frame 540 may be disposed adjacent to the internal surface of the insertion groove 522 of the first frame 520. As an exemplary embodiment of the present disclosure, the lower end portion of the second frame 540 may have a rectangular shape for coupling with the first frame 520.

Furthermore, the first layer 440 and the second layer 460 are joined while being cut at the edge portion of the insertion groove 522 when the first and second frames 520 and 540 are combined.

Accordingly, in the semi-finished product formed by the first and second frames 520 and 540, the cut portions of the first and second layers 440 and 460 are formed in upper edge portions, and the lower surface may be formed to be stepped.

Accordingly, the cover layer 480 of the luggage board 400 is disposed to be rounded while covering the upper edge portion, which is a portion in which the first layer 440 and the second layer 460 are joined, preventing the problem of not forming the corner portion of the luggage board 400 for a car.

FIG. 11, FIG. 12, FIG. 13 and FIG. 14 are explanatory views exemplarily illustrating a method of manufacturing a luggage board for a vehicle according to an exemplary embodiment of the present disclosure.

Figure 11:
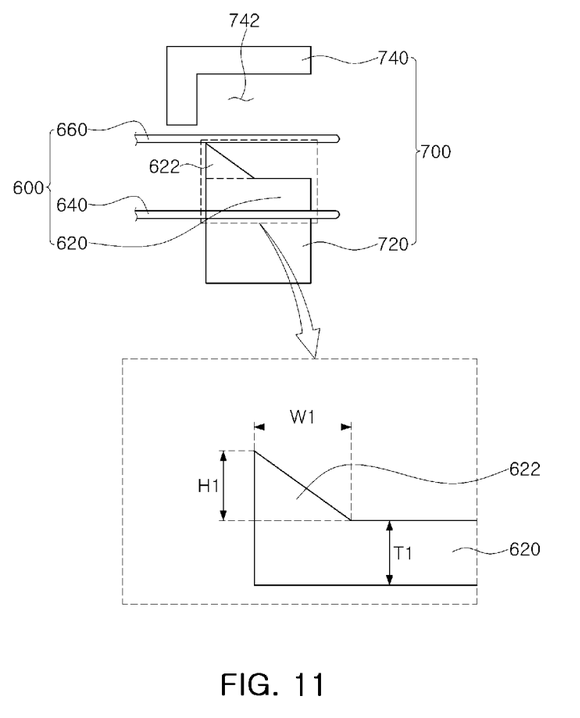
FIG. 11, FIG. 12, FIG. 13 and FIG. 14 are explanatory views exemplarily illustrating a method of manufacturing a luggage board for a vehicle according to an exemplary embodiment of the present disclosure.

First, referring to FIG. 11, a first frame 720 may have a rectangular parallelepiped shape inserted into an indentation groove 742 of a second frame 740.

On the other hand, after loading a first layer 640 on the upper surface of the first frame 720, a core layer 620 is loaded on the first layer 640. Thereafter, a second layer 660 is loaded between the core layer 620 and the second frame 740.

On the other hand, an edge portion of the core layer 620 may be provided with a protrusion 622 disposed to protrude upwards. As an exemplary embodiment of the present disclosure, the protrusion 622 may have a triangular cross-section. Furthermore, a protruding width W1 of the protrusion 622 may have a length equal to 20% to 40% of a thickness T1 of the center portion of the core layer 620. For example, when the thickness of the center portion of the core layer 620 is 20 mm, the protruding width W1 of the protrusion 622 may be 24 mm to 28 mm. Furthermore, a protruding height HI of the protrusion 622 may have a length equal to 40% to 60% of the thickness T1 of the center portion of the core layer 620. For example, when the thickness of the center portion of the core layer 620 is 20 mm, the protruding height HI of the protrusion 622 may be 28 mm to 32 mm.

Figure 12:
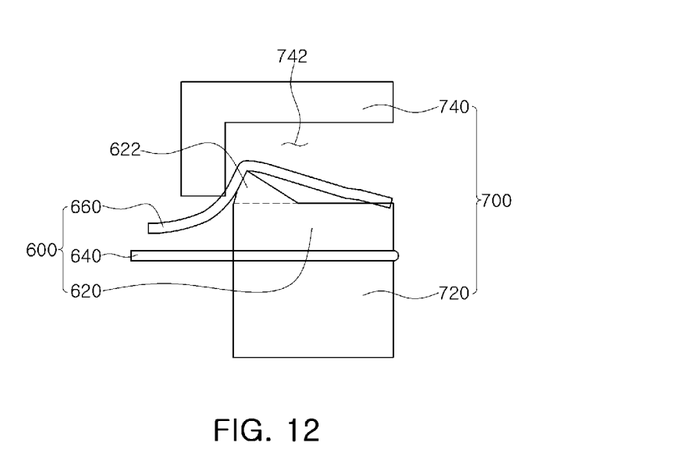
Figure 13:
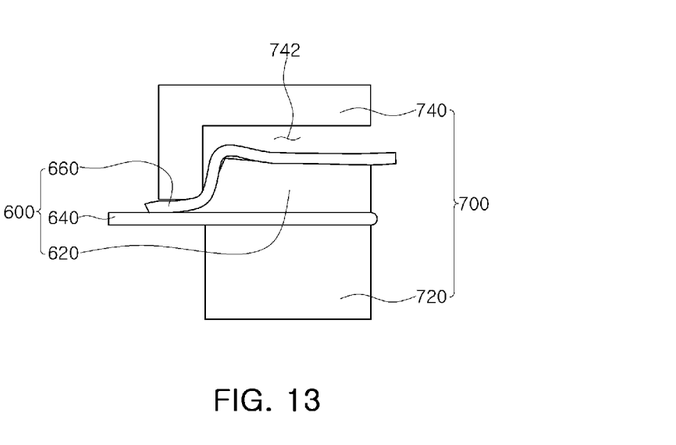
Figure 14:
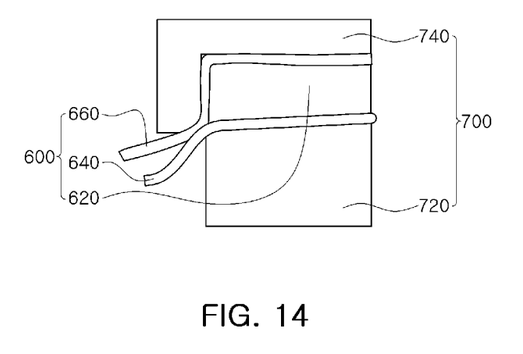

For example, because the protrusion 622 is provided on the core layer 620, defects occurring at the upper edge portion of the luggage board 600 for a vehicle when the first and second frames 720 and 740 are combined may be reduced. For example, as illustrated in FIG. 12, FIG. 13 and FIG. 14, when the first frame 720 is combined with the second frame 740 to compress the core layer 620, the first layer 640, and the second layer 660, the surface is melted at the edge portion of the core layer 620 and a thickness loss occurs. Furthermore, as the tension pressure of the second layer 660 increases in a region disposed at the edge portion of the indentation groove 742 of the second frame 740, a thickness loss is additionally generated. However, because the protrusion 622 is provided on the core layer 620, a round shape defect may be prevented even in a case in which a thickness loss occurs on the upper edge portion of the luggage board 600. Accordingly, an appearance defect of the luggage board 600 may be prevented from occurring.

As set forth above, according to an exemplary embodiment of the present disclosure, there is an effect that the appearance quality may be maintained while being excellent in rigidity.

Furthermore, according to an exemplary embodiment of the present disclosure, manufacturing may be facilitated.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A luggage board for a vehicle, the luggage board comprising:
    a core layer;
    a first layer covering a portion of the core layer;
    a second layer covering a remaining portion of the core layer except for a region covered by the first layer; and
    a cover layer disposed to cover at least a portion of the second layer,
    wherein end portions of the first layer and the second layer disposed on a side surface of the core layer are bonded to each other,
    wherein the end portion of the first layer is bent outwardly forming a step with the second layer,
    wherein the first layer disposed on the side surface of the core layer is disposed further inwardly than the second layer disposed on the side surface of the core layer,
    wherein an end portion of at least one of the first layer and the second layer is bent,
    wherein the end portion of the first layer is disposed to overlap with the end portion of the second layer both horizontally and vertically,
    wherein a bonding portion between the first layer and the second layer is disposed on an upper edge side of the core layer,
    wherein the core layer has a step portion disposed on an edge portion of a lower surface in the core layer,
    wherein an end portion of the cover layer is disposed on the step portion of the core layer, and,
    wherein the cover layer is disposed to be rounded while covering the bonding portion between the first layer and the second layer.

2. The luggage board of claim 1,
    wherein the first layer includes a first intermediate layer, a first-first layer disposed on a first surface of the first intermediate layer, and a first-second layer disposed on a second surface of the first intermediate layer, and
    wherein the second layer includes a second intermediate layer, a second-first layer disposed on a first surface of the second intermediate layer, and a second-second layer disposed on a second surface of the second intermediate layer.

3. The luggage board of claim 2,
    wherein the first intermediate layer and the second intermediate layer are formed of a material including a fiberglass material and a polypropylene material, and
    wherein the fiberglass is contained in an amount of 20% to 60%.

4. The luggage board of claim 3, wherein the fiberglass included in the first intermediate layer and the second intermediate layer is contained in an amount of 30% to 55%.

5. The luggage board of claim 2, wherein the first-second layer in contact with the core layer, and the second-first layer include a polypropylene film.

6. The luggage board of claim 1, wherein the core layer is formed of a material including one of expanded polystyrene, expanded polypropylene (EPP), and expanded polyolefin (EPO).

7. The luggage board of claim 2, wherein the first-first layer is formed of a nonwoven fabric of a polypropylene film or polyethylene terephthalate material.

8. The luggage board of claim 1, wherein the cover layer is formed of a non-woven fabric or a woven fabric.

9. The luggage board of claim 1,
    wherein the core layer is provided with a protrusion in a region disposed at an edge portion of the core layer,
    wherein a protruding width of the protrusion has a length equal to 20% to 40% of a thickness of a center portion of the core layer, and
    wherein a protruding height of the protrusion has a length equal to 40% to 60% of the thickness of the center portion of the core layer.

* * * * *

UNITED STATES PATENT AND TRADEMARK OFFICE
CERTIFICATE OF CORRECTION

| | | |
|---|---|---|
| PATENT NO. | : 12,466,324 B2 | Page 1 of 1 |
| APPLICATION NO. | : 17/984844 | |
| DATED | : November 11, 2025 | |
| INVENTOR(S) | : Hee Sang Park et al. | |

It is certified that error appears in the above-identified patent and that said Letters Patent is hereby corrected as shown below:

On the Title Page

Item [30], insert:
--May 04, 2022 (KR) ......... 10-2022-0055637--

Signed and Sealed this
Thirtieth Day of December, 2025

John A. Squires
*Director of the United States Patent and Trademark Office*